(12) United States Patent
Chen

(10) Patent No.: US 12,149,963 B2
(45) Date of Patent: Nov. 19, 2024

(54) OPTIMIZATION METHOD AND COMMUNICATION DEVICE THEREOF

(71) Applicant: Wistron Corporation, New Taipei (TW)

(72) Inventor: Chih-Ming Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 129 days.

(21) Appl. No.: 18/123,341

(22) Filed: Mar. 20, 2023

(65) Prior Publication Data

US 2024/0236710 A1 Jul. 11, 2024

(30) Foreign Application Priority Data

Jan. 5, 2023 (TW) ................................ 112100333

(51) Int. Cl.
*H04W 24/02* (2009.01)
*H04B 7/0456* (2017.01)

(52) U.S. Cl.
CPC .......... *H04W 24/02* (2013.01); *H04B 7/0456* (2013.01)

(58) Field of Classification Search
CPC ............................. H04W 24/02; H04B 7/0456
See application file for complete search history.

(56) References Cited

U.S. PATENT DOCUMENTS 10,230,510 B2 *   3/2019   Yogeeswaran ....... H04B 7/0626
2010/0322351 A1  12/2010   Tang 2019/0268854 A1 *  8/2019   Suzuki .................. H04L 5/0094
2021/0242983 A1 *  8/2021   Yoshimura ............ H04L 1/0071
2023/0353226 A1 * 11/2023   Bai ..................... H04B 7/06952

FOREIGN PATENT DOCUMENTS

JP   2022-505983 A   1/2022

OTHER PUBLICATIONS

Songjie Yang et al., Bayesian Optimization-Based Beam Alignment for MmWave MIMO Communication Systems, 2022 IEEE 33rd Annual International Symposium on Personal, Indoor and Mobile Radio Communications(PIMRC), 2022, pp. 825-830, Internet<URL:https://ieeexplore.ieee.org/s tamp/stamp.jsp?arnumber=9977858>, 2022.
Virginia Aglietti et al., Causal Bayesian Optimization, Proceedings of the Twenty Third International Conference on Artificial Intelligence and Statistics, vol. 108, 2020, Internet<URL:https://proceedings.mlr.press/v108/aglietti20a/aglietti20a.pdf>, 2020.
Virginia Aglietti et al., Dynamic Causal Bayesian Optimization, 35th Conference on Neural Information Processing Systems(NeurIPS 2021), pp. 1-12, Internet<URL:https://proceedings.neurips.cc/paper_files/paper/2021/file/577bcc914f9e55d5e4e4f82f9f00e7d4-Paper.pdf>, 2021.

* cited by examiner

*Primary Examiner* — Dac V Ha
(74) *Attorney, Agent, or Firm* — Winston Hsu

(57) ABSTRACT

To maximize throughput, an optimization method includes determining at least one precoding matrix and at least one combining matrix together according to Bayesian Optimization, Causal Bayesian Optimization, or Dynamic Causal Bayesian Optimization, and outputting the at least one precoding matrix and the at least one combining matrix. The at least one precoding matrix is configured for at least one precoder of a transmitter. The at least one combining matrix is configured for at least one combiner of at least one receiver.

20 Claims, 9 Drawing Sheets

OPTIMIZATION METHOD AND COMMUNICATION DEVICE THEREOF

BACKGROUND OF THE INVENTION

1. Field of the Invention

The present invention relates to an optimization method and a communication device thereof, and more particularly, to an optimization method and a communication device thereof, which improve throughput.

2. Description of the Prior Art

A base station transmits signals to user equipment (UE), which estimates the preferable precoding matrix indicator (PMI) and provides feedback to the base station via a channel state information (CSI) report. Since the base station only takes the CSI report as a suggestion to decide a precoding matrix (instead of determining the precoding matrix according to the CSI report), and the UE estimates its own combining matrix, the sum rate (i.e., throughput) between the base station and the UE may be suboptimal. Therefore, there is still room for improvement when it comes to how to determine the precoding matrix and the combining matrix.

SUMMARY OF THE INVENTION

It is therefore a primary objective of the present invention to provide an optimization method and a communication device thereof to improve throughput.

An embodiment of the present invention discloses an optimization method includes determining at least one precoding matrix and at least one combining matrix together according to Bayesian Optimization, Causal Bayesian Optimization, or Dynamic Causal Bayesian Optimization; and outputting the at least one precoding matrix and the at least one combining matrix, wherein one precoding matrix is configured for at least one precoder of a transmitter, and the at least one combining matrix is configured for at least one combiner of at least one receiver.

An embodiment of the present invention discloses a communication device includes a storage circuit, configured to store instructions of determining at least one precoding matrix and at least one combining matrix together according to Bayesian Optimization, Causal Bayesian Optimization, or Dynamic Causal Bayesian Optimization; and outputting the at least one precoding matrix and the at least one combining matrix, wherein one precoding matrix is configured for at least one precoder of a transmitter, and the at least one combining matrix is configured for at least one combiner of at least one receiver; and a processing circuit, coupled to the storage device, configured to execute the instructions stored in the storage circuit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
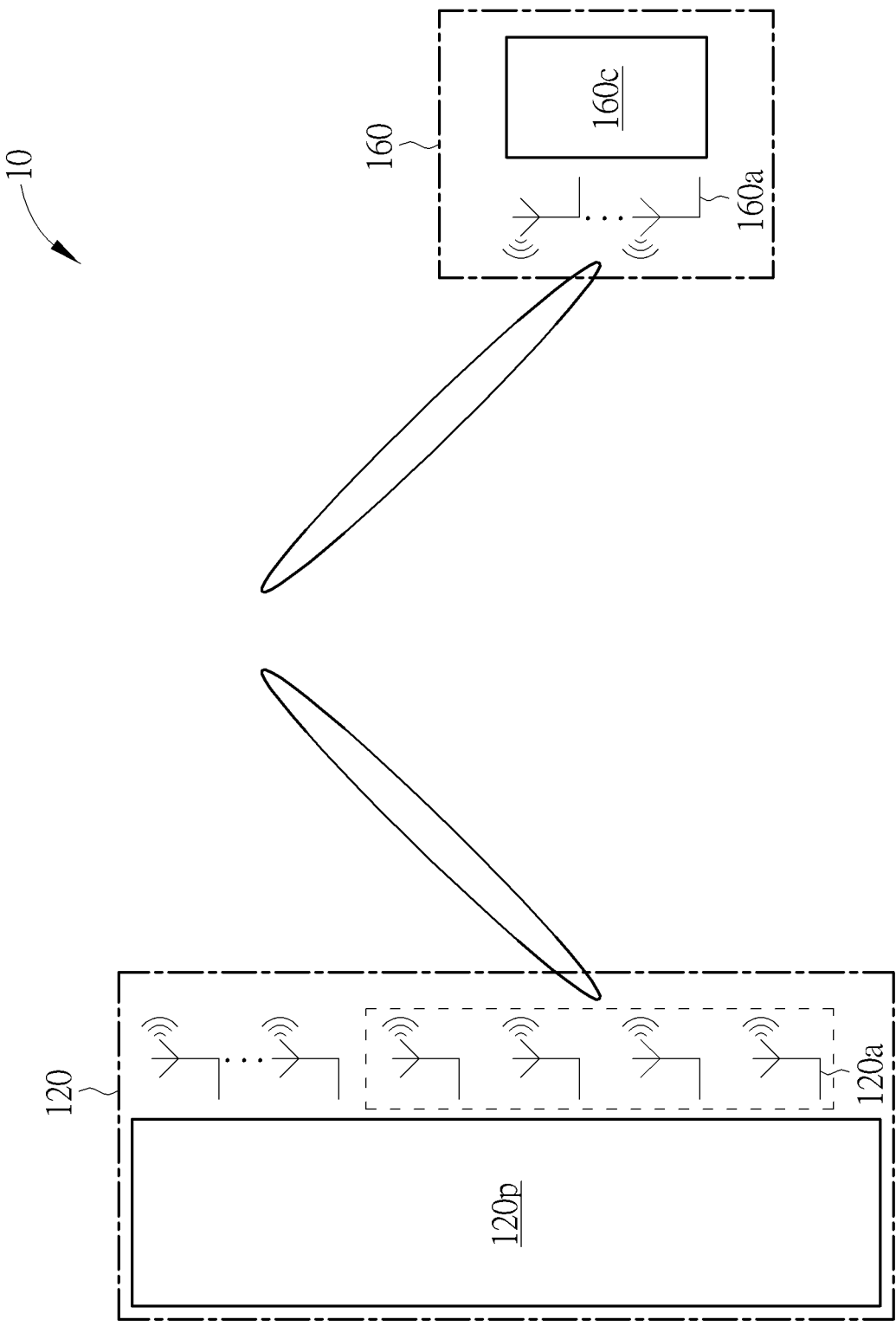
FIG. 1 to FIG. 3 are schematic diagrams of communication systems according to embodiments of the present invention.

FIG. 1 is a schematic diagram of a communication system 10 according to an embodiment of the present invention. The communication system 10 may support Multiple-input multiple-output (MIMO) transmission. A transmitter 120 of the communication system 10 may include a plurality of antennas 120a and a precoder 120p; a receiver 160 of the communication system 10 may include a plurality of antennas 160a and a combiner 160c. The communication system 10 may use an algorithm (e.g., an optimization method to be elaborated below) to optimize a precoding matrix of the precoder 120p and a combined matrix of the combiner 160c together/jointly (at a time or in one go). In other words, the precoding matrix for the transmitter 120 and the combining matrix for the receiver 160 are not selected individually by the transmitter 120 and the receiver 160 respectively. In this way, the communication system 10 may maximize the sum rate (i.e., throughput) between the transmitter 120 and the receiver 160.

Figure 2:
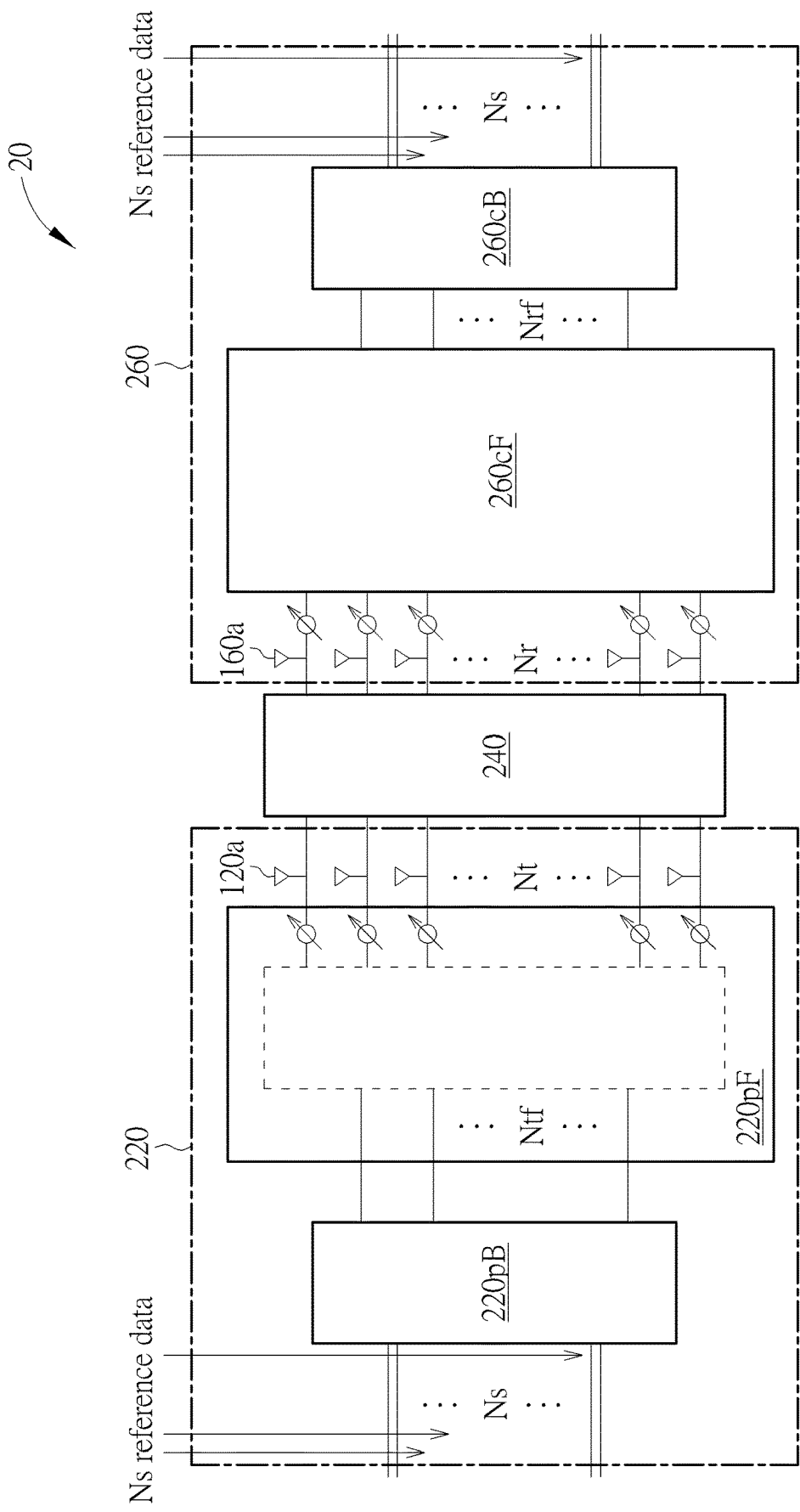

FIG. 2 is a schematic diagram of a communication system 20 according to an embodiment of the present invention. The communication system 10 may be implemented in the form of the communication system 20. A transmitter 220 of the communication system 20 may include Nt antennas 120a, a digital precoder 220pB, and an analog precoder 220pF; a receiver 260 of the communication system 20 may include Nr antennas 160a, an analog combiner 260cF, and a digital combiner 260cB.

The transmitter 220 intends to send Ns data streams to the receiver 260; correspondingly, the receiver 260 receives a received signal Y The received signal Y may satisfy Y=HFBX+N, where X denotes the signal that the transmitter 220 intends to send, B denotes a precoding matrix of the digital precoder 220pB, F denotes a precoding matrix of the analog precoder 220pF, H denotes a channel matrix of a channel 240, and N denotes noises. The receiver 260 may process the received signal Y to obtain a signal Z. The signal Z may satisfy $Z=W_B W_F HFBX + W_B W_F N$, where $W_F$ denotes a combining matrix of the analog combiner 260cF, and $W_B$ denotes a combining matrix of the digital combiner 260cB. The channel matrix H, the precoding matrixes F, B, and the combining matrixes $W_F$, $W_B$ may be an Nr×Nt, Nt×Ntf, Ntf×Ns, Nrf×Nr, and Ns×Nrf matrixes, respectively, where Ntf is greater than or equal to Ns, Ntf is less than or equal to Nt, Nrf is greater than or equal to Ns, and Nrf is less than or equal to Nr.

In addition, one reference data is added to each of the Ns data streams at the transmitter 220. As there are Ns data streams, Ns reference data is added in total. The Ns reference data may correspond to one input reference data θ. The receiver 260 may retrieve/extract Ns reference data (from the received signal Y), and the Ns reference data may correspond to one output reference data T. The input reference data θ and the output reference data T may be Ns×1 vectors and 1×Ns vectors, respectively. The present invention may use an algorithm (e.g., Bayesian Optimization, Causal Bayesian Optimization, Dynamic Causal Bayesian Optimization, or Dynamic Causal Bayesian Optimization based Minimum Mean Square Error) to minimize the expected value of the square of the error between the input reference data θ and the output reference data T (i.e., using the Ns reference data), and thus determine/find/select the (optimal) precoding matrixes F, B and the (optimal) combining matrixes $W_F$, $W_B$ together/jointly/simultaneously/parallelly, instead of individually selecting the precoding matrix by the transmitter 120 and selecting the combining matrix by the receiver 160.

Figure 3:
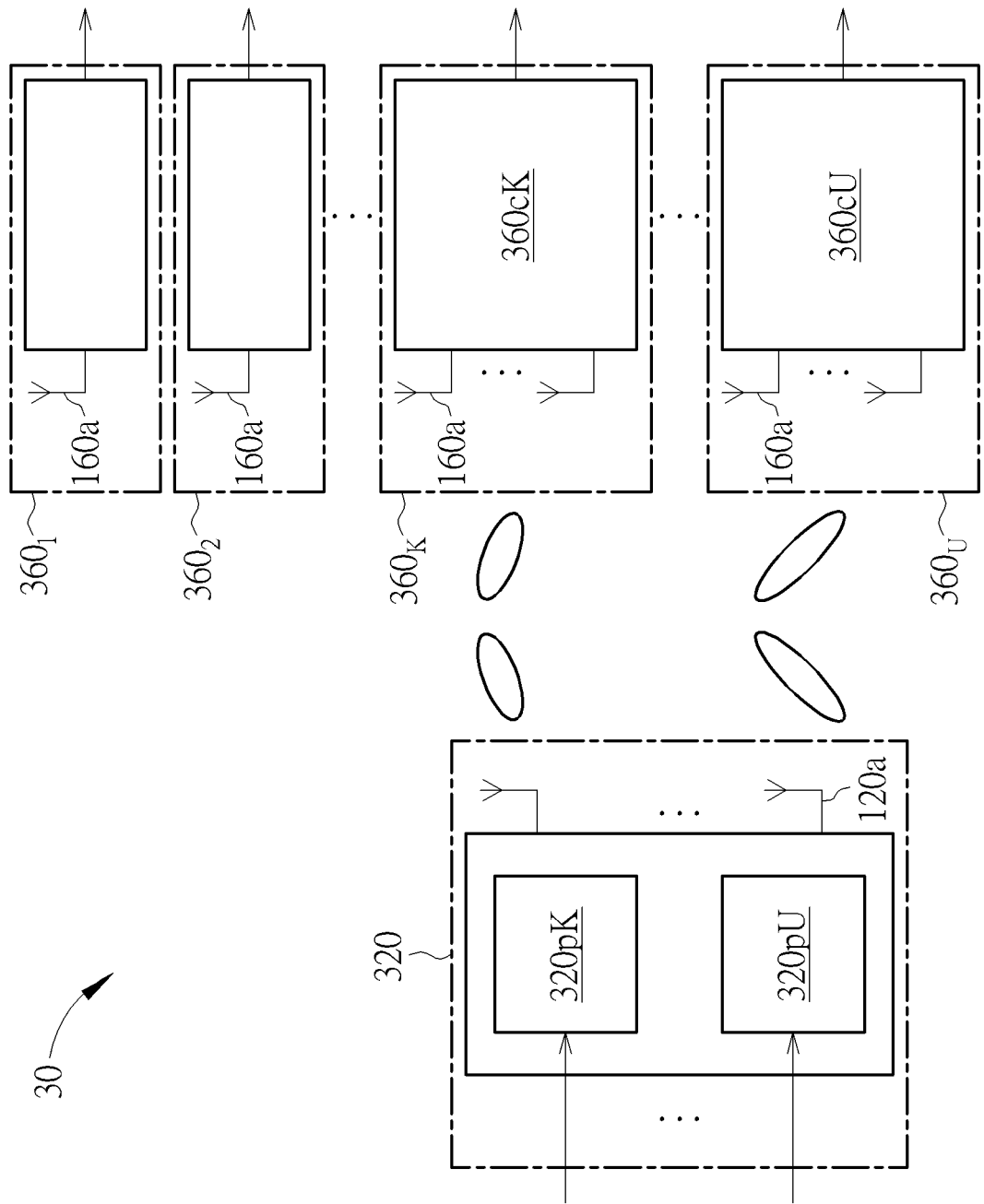

FIG. 3 is a schematic diagram of a communication system 30 according to an embodiment of the present invention. The communication system 10 or 20 may be implemented in the form of the communication system 30. A transmitter 320 of the communication system 30 may include a plurality of antennas 120a and precoders 320pK, 320pU. The communication system 30 may include receivers $360_1$, ..., $360_K$, ..., $360_U$, where K and U are positive integers. The transmitter 320 may conduct multiuser transmission to the receivers $360_K$, $360_U$. The receivers $360_K$, $360_U$ of the communication system 30 may include a plurality of antennas 160a and combiners 360cK, 360cU respectively. The communication system 30 may use an algorithm to optimize the precoding matrix of the precoder 320pK (and/or 320pU) and the combined matrix of the combiner 360cK (and/or 360cU) together/jointly, instead of individually selecting the precoding matrix by the transmitter 320 and selecting the combining matrixes by the receivers $360_K$, $360_U$. In this way, the communication system 30 may maximize beamforming throughput.

Figure 4:
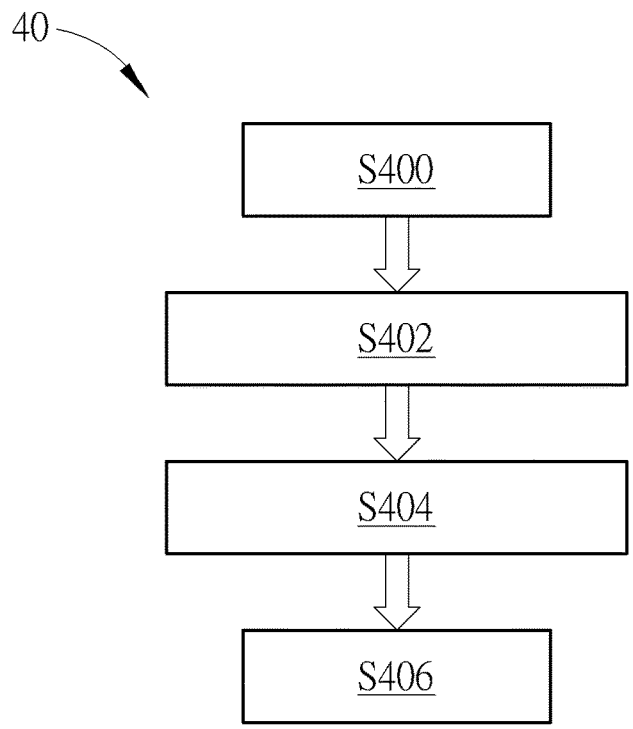
FIG. 4 is a schematic diagram of an optimization method according to an embodiment of the present invention.

FIG. 4 is a schematic diagram of an optimization method 40 according to an embodiment of the present invention. The optimization method 40 is available to the communication system 10, 20, or 30. The optimization method 40 may be compiled into a code, which may be executed by a processing circuit and stored in a storage circuit. The steps of the optimization method 40 may include the following steps:

Step S400: Start.

Step S402: Determine/Compute/Update at least one precoding matrix (e.g., the precoding matrix B of the digital precoder 220pB, the precoding matrix F of the analog precoder 220pF, or the precoding matrix of the precoder 320pK, 320pU, or 120p) and at least one combining matrix (e.g., the combining matrix $W_F$ of the analog combiner 260cF, the combining matrix $W_B$ of the digital combiner 260cB, or the combining matrix of the combiner 360cK, 360cU, or 160c) together according to Bayesian Optimization, Causal Bayesian Optimization, or Dynamic Causal Bayesian Optimization. Bayesian Optimization, Causal Bayesian Optimization, or Dynamic Causal Bayesian Optimization may be applied to at least one data to determine the at least one precoding matrix and the at least one combining matrix together. The at least one data may be extracted from a signal transmitted from the transmitter (e.g., 120, 220, or 320) or received by the receiver (e.g., $360_1$ to $360_U$, 260, or 160) (e.g., a reference signal (e.g., the input reference data θ or the output reference data T), downlink control information (DCI), uplink control information (UCI), a CSI report, or a signaling).

Step S404: Output information about the at least one precoding matrix configured for a transmitter and the at least one combining matrix configured for receiver(s).

Step S406: End.

In step S402, the present invention may leverage Bayesian Optimization, Causal Bayesian Optimization, or Dynamic Causal Bayesian Optimization to select optimal values/results of independent variables (e.g., the precoding matrix and the combining matrix) to achieve minimal loss function value at any instance of time. That is, the optimal values/results are able to minimize a loss function at an arbitrary time. The loss function may be the mean squared error (MSE) of reference data (e.g., the expected value of the square of the error between the input reference data θ and the output reference data T, that is, $E((T-\theta)^2)$ or $E(\|T-\theta\|^2)$). (The input reference data θ or the output reference data T may be flipped over its diagonal to produce the transpose of the input reference data θ or the output reference data T before the error is calculated.)

Take Bayesian Optimization as an example. Bayesian Optimization is a black-box optimization algorithm for solving extremum problems of functions whose expressions are unknown. For example, $L(P_{dt}, A_{dt}, P_{rt}, A_{rt}, P_{rr}, A_{rr}, P_{dr}, A_{dr})$=uef($P_{dt}, A_{dt}, P_{rt}, A_{rt}, P_{rr}, A_{rr}, P_{dr}, A_{dr}$), where L( ) may represent the loss function of a model (which may serve as an objective function), uef( ) may represent a function whose expression is unknown, $P_{dt}$ may represent the phase adjustment of the precoding matrix B (i.e., how the digital precoder 220pB affects the phase of the signal X), $A_{dt}$ may represent the amplitude adjustment of the precoding matrix B (i.e., how the digital precoder 220pB affects the amplitude of the signal X), $P_{rt}$ may represent the phase adjustment of the precoding matrix F (i.e., how the analog precoder 220pF affects the phase of the signal X further), $A_{rt}$ may represent the amplitude adjustment of the precoding matrix F (i.e., how the analog precoder 220pF affects the amplitude of the signal X further), $P_{rr}$ may represent the phase adjustment of the combining matrix $W_F$ (i.e., how the analog combiner 260cF affects the phase of the received signal Y), AT may represent the amplitude adjustment of the combining matrix $W_F$ (i.e., how the analog combiner 260cF affects the amplitude of the received signal Y), $P_{dr}$ may represent the phase adjustment of the combining matrix $W_B$ (i.e., how the digital combiner 260cB affects the phase of the received signal Y further), and $A_{dr}$ may represent the amplitude adjustment of the combining matrix $W_B$ (i.e., how the digital combiner 260cB affects the amplitude of the received signal Y further). In another embodiment, $L(B, F, W_F, W_B)$=uef(B, F, $W_F$, $W_B$). In another embodiment, L(M1, ..., Mr)= uef(M1, ..., Mr), wherein r is a positive integer, M1 to Mr may represent precoding matrix/matrixes (e.g., the precoding matrix B of the digital precoder 220pB, the precoding matrix F of the analog precoder 220pF, or the precoding matrix of the precoder 320pK, 320pU, or 120p) and combining matrix/matrixes (e.g., the combining matrix $W_F$ of the analog combiner 260cF, the combining matrix $W_B$ of the digital combiner 260cB, or the combining matrix of the combiner 360cK, 360cU, or 160c). In another embodiment, L(P1, ..., Pm, A1, ..., An)=uef(P1, ..., Pm, A1, ..., An), wherein m and n are positive integers, P1 to Pm may represent the phase adjustments of precoding matrix/matrixes (e.g., the precoding matrix B of the digital precoder 220pB, the precoding matrix F of the analog precoder 220pF, or the precoding matrix of the precoder 320pK, 320pU, or 120p) and combining matrix/matrixes (e.g., the combining matrix $W_F$ of the analog combiner 260cF, the combining matrix $W_B$ of the digital combiner 260cB, or the combining matrix of the combiner 360cK, 360cU, or 160c), and A1 to An represent the amplitude adjustment of the precoding matrix/matrixes and the combining matrix/matrixes.

In other words, the expression of the relationship function uef( ) among the loss function L( ), phase adjustments (e.g., $P_{dt}$, $P_{rt}$, $P_{rr}$, $P_{dr}$) and amplitude adjustments (e.g., $A_{dt}$, $A_{rt}$, $A_{rr}$, $A_{dr}$) of a model is unknown. The phase adjustments (e.g., $P_{dt}$, $P_{rt}$, $P_{rr}$, $P_{dr}$) and the amplitude adjustments (e.g., $A_{dt}$, $A_{rt}$, $A_{rr}$, $A_{dr}$) at arbitrary time to minimize the loss function L( ) may be calculated by using Bayesian Optimization. In this way, the digital precoder 220pB, the analog precoder 220pF (or the precoder 320pK, 320pU, or 120p), the analog combiner 260cF, the digital combiner 260cB (or the combiner 360cK, 360cU, or 160c) may be updated/reconfigured, such that the sum rate between the transmitter 120/220/320 and the receiver 160/260/360$_K$/360$_U$ is maximized.

Figure 5:
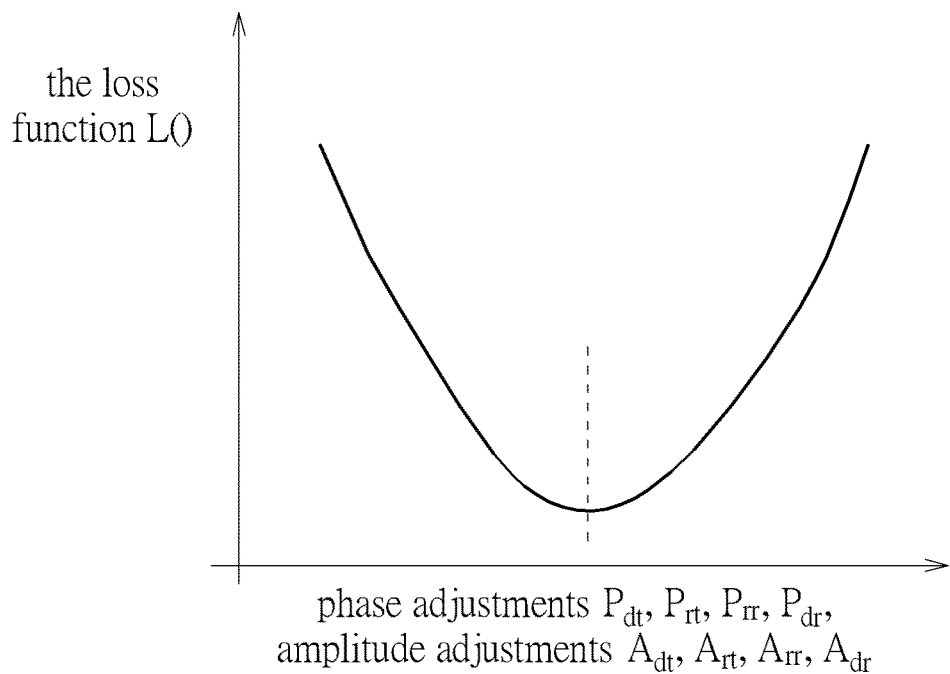
FIG. 5 is a schematic diagram of the relationship between the loss function, the phase adjustments, and the amplitude adjustments according to an embodiment of the present invention.

For example, FIG. 5 is a schematic diagram of the relationship between the loss function L( ), the phase adjustments $P_{dt}$, $P_{rt}$, $P_{rr}$, $P_{dr}$ (or P1 to Pm), and the amplitude adjustments $A_{dt}$, $A_{rt}$, $A_{rr}$, $A_{dr}$ (or A1 to An) according to an embodiment of the present invention. However, FIG. 5 is only for illustration to specify that there are relationships among the loss function L( ), the phase adjustments, and the amplitude adjustments, while the expression of the relationship function uef( ) among the loss function L( ), the phase adjustments, and the amplitude adjustments is unknown in most cases. Coordinates of one single point on the horizontal axis of FIG. 5 may correspond to a point in the multi-dimensional space formed/constituted by the phase adjustments $P_{dt}$, $P_{rt}$, $P_{rr}$, $P_{dr}$ (or P1 to Pm), and the amplitude adjustments $A_{dt}$, $A_{rt}$, $A_{rr}$, $A_{dr}$ (or A1 to An).

Figure 6:
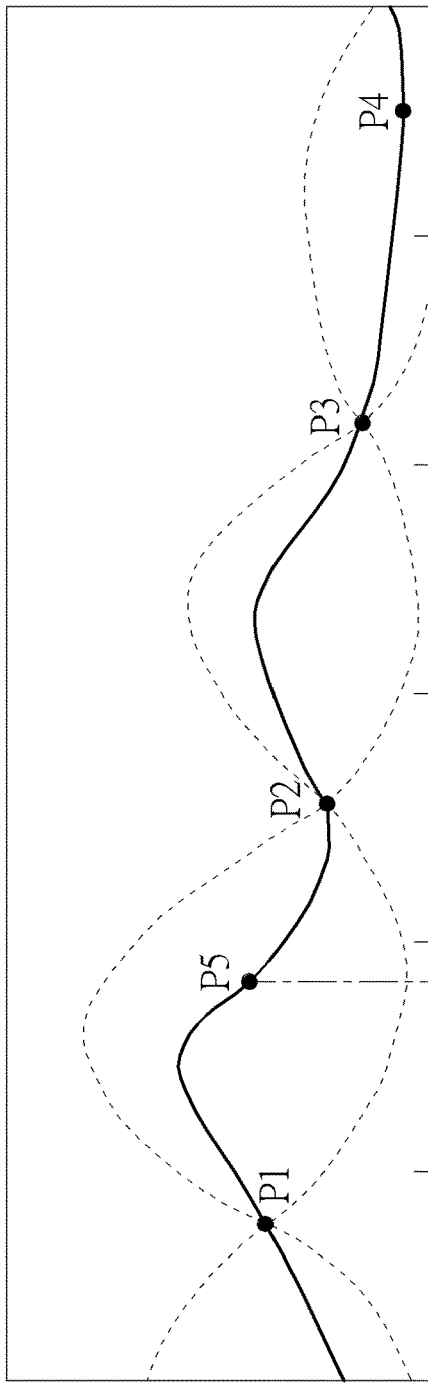
FIG. 6 is a schematic diagram of Bayesian Optimization for a one-dimensional problem according to an embodiment of the present invention.
Figure 6:
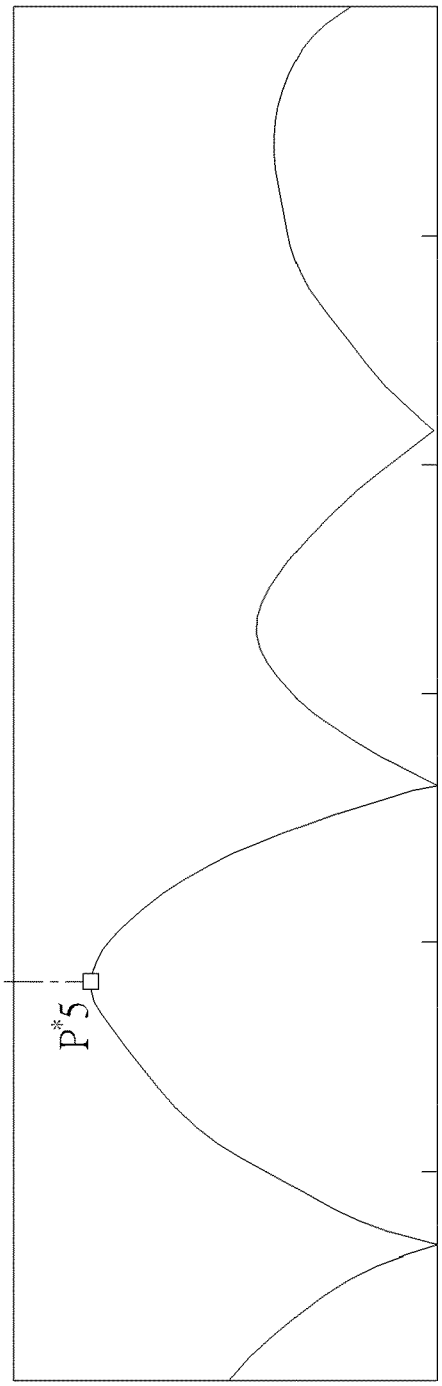

Since the expression of the relationship function uef( ) is unknown, Bayesian Optimization may roughly fit the relationship function uef( ) using partial/finite sampling points and leverage information of previous sampling point(s) to determine the next sampling point so as to find extremum point(s). For example, FIG. 6 is a schematic diagram of Bayesian Optimization for a one-dimensional problem according to an embodiment of the present invention, where the thick solid line represents estimated function values of the loss function L( ), solid black points P1 to P5 respectively represent sampling points which have been found, the area enclosed by two dotted lines represents the fluctuation range (centered on a mean value and proportional to a standard deviation) of the loss function L( ) at each point, and the thin solid line represents an acquisition function. The idea of Bayesian Optimization is to first generate an initial candidate solution set (e.g., the loss function L( ), the phase adjustments, and the amplitude adjustments corresponding to the solid black point P1), then search for the next sampling point (e.g., the solid black point P2), which may have an extreme value, based on the initial candidate solution set, repeatedly search for the next sampling point (e.g., the solid black points P3-P5), which may have an extreme value, until the iteration terminates, and add all the searched sampling points (e.g., the solid black points P1-P5) to the candidate solution sets. Finally, a (global) extremum point is found from the sampling points of the candidate solution sets as the solution of the problem (e.g., the loss function L( ), the phase adjustments, and the amplitude adjustments corresponding to the solid black point P5), thereby find/determine the precoding matrix/matrixes configured for the precoder(s) and the combining matrix/matrixes configured for the combiner(s) together.

Bayesian Optimization estimates mean value(s) and variance(s) of the true loss function based on the function values of the sampling points that have been found (e.g., the loss function corresponding to the solid black point P1) to determine the next sampling point (e.g., the solid black point P2) according to the sampling point already found (e.g., the solid black point P1). The estimated loss function (i.e., the mean value of the loss function at each point) represented by the thick solid line in FIG. 6 passes through the sampling points (e.g., the solid black points P1-P4), and the variance is minimized. The variance is larger when the estimated objective function is far from the sampling point (e.g., the solid black points P1-P4). The acquisition function represented by the thin solid line in FIG. 6 may be constructed according to mean values and variances; that is, the acquisition function may be a function of mean values and variances. The estimation of the possibility that a point (e.g., one of the solid black points P1-P5) is an extremum point of the loss function reflects the degree that the point is worth searching. A relative extremum point of the acquisition function may correspond to the next sampling point of the loss function: For example, the point P*5 represented by the rectangular box in FIG. 6 is the maximum point of the acquisition function and may correspond to the next sampling point (i.e., the solid black point P5) of the loss function (according to the phase adjustments, and the amplitude adjustments corresponding to the maximum point).

The algorithm of the present invention may use Gaussian process regression to predict the probability distribution of a function value of the loss function LO at any point based on the function values of the loss function LO at a set of sampling points. Gaussian process regression may extend to observations with independent normally distributed noise of known variance. The variance may be unknown, so it may assume that the noise is of common variance and that the noise includes the variance as a hyperparameter. The present invention uses the posterior mean of the Gaussian process that includes noise, which is a drift value rather than the noise of a Signal to Interference plus Noise Ratio (SINR). In one embodiment, environmental factors such as temperature and humidity or precoder(s)/combiner(s) (i.e., noise which causes interference) may have an influence on the output of the precoder(s)/combiner(s), causing a drift value of the loss function with respect to certain phase adjustment(s) and certain amplitude adjustment(s). In other words, a selected sampling point (e.g., the solid black point P5) may not select/correspond to the desired/expected extremum of the functional relationship uef( ), but may select/correspond to a relatively optimized extremum close to the desired/expected extremum of the functional relationship uef( ) (i.e., the extremum of the functional relationship uef( ) disturbed by noise).

According to result(s) of Gaussian process regression, an acquisition function (which is used to measure the degree that each point of the loss function is worth exploring) may be constructed to find a (relative) extremum of the acquisition function so as to determine the next sampling point of the loss function. The acquisition function may be, for example, knowledge gradient (KG), entropy search (ES), or predictive entropy search (PES). Afterwards, the extremum of the function values of the set of sampling points (which have been found since the beginning) is returned as the extremum of the loss function (e.g., the minimum loss function in response to the optimal phase adjustments and the optimal amplitude adjustments). The precoding matrix/matrixes configured for the precoder(s) and the combining matrix/matrixes configured for the combiner(s) may thus be found.

In one embodiment, there may be many independent variables to be considered by the algorithm of the present invention (in addition to the precoder(s) and the combiner(s)). When the spatial dimension grows, the performance of Bayesian Optimization may deteriorate exponentially. Therefore, the algorithm of the present invention may extend to Causal Bayesian Optimization (CBO). In other words, the present invention may use Causal Bayesian Optimization to calculate the optimal/minimum loss function when the loss function L( ) is related to the phase adjustments (e.g., $P_{dt}$, $P_{rt}$, $P_{rr}$, $P_{dr}$), the amplitude adjustments (e.g., $A_{dt}$, $A_{rt}$, $A_{rr}$, $A_{dr}$), and other independent variable(s).

Figure 7:
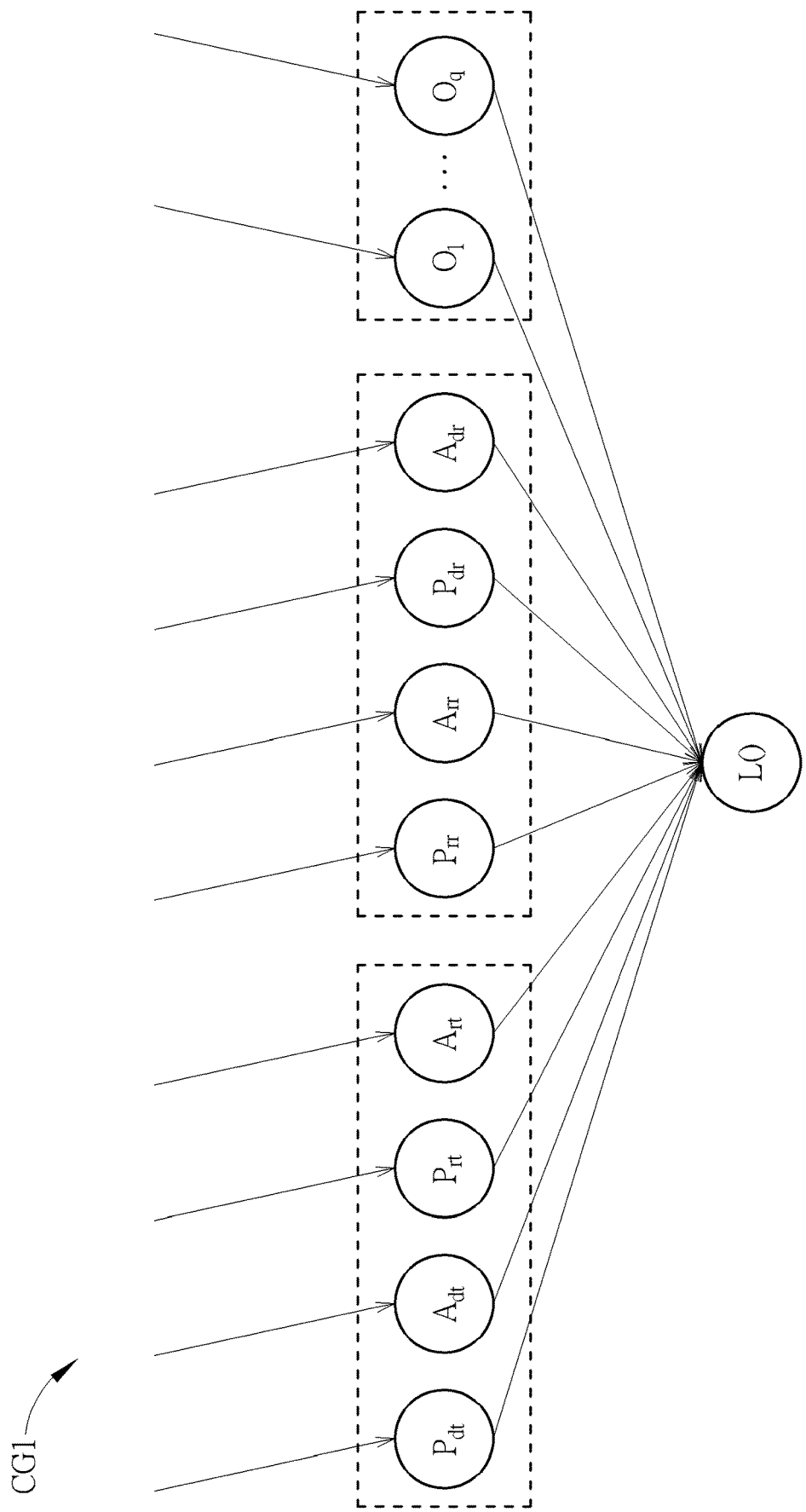
FIG. 7 is a schematic diagram of part of a causal graph according to an embodiment of the present invention.

Specifically, the present invention may find the causal relationship between the loss function L( ), the phase adjustments (e.g., $P_{dt}$, $P_{rt}$, $P_{rr}$, $P_{dr}$), the amplitude adjustments (e.g., $A_{dt}$, $A_{rt}$, $A_{rr}$, $A_{dr}$), and/or other independent variable(s) (e.g., a causal graph of the loss function L( ), the phase adjustments (e.g., $P_{dt}$, $P_{rt}$, $P_{rr}$, $P_{dr}$), the amplitude adjustments (e.g., $A_{dt}$, $A_{rt}$, $A_{rr}$, $A_{dr}$), and/or other independent variable(s)). Therefore, the loss function L( ), the phase adjustments (e.g., $P_{dt}$, $P_{rt}$, $P_{rr}$, $P_{dr}$), the amplitude adjustments (e.g., $A_{dt}$, $A_{rt}$, $A_{rr}$, $A_{dr}$), and/or other independent variable(s) may be regarded as causal variables. For example, FIG. 7 is a schematic diagram of part of a causal graph CG1 according to an embodiment of the present invention. The loss function L( ), independent variables $O_1$ to $O_q$ (which is optional and may be omitted), the phase adjustments (e.g., $P_{dt}$, $P_{rt}$, $P_{rr}$, $P_{dr}$), the amplitude adjustments (e.g., $A_{dt}$, $A_{rt}$, $A_{rr}$, $A_{dr}$) serving as causal variables constitute the causal graph CG1 used by a causal model, where q is a positive integer. As shown in FIG. 7, the causal dimensionality found by Causal Bayesian Optimization may be 8+q (or a number equal to or less than 8), so there are 8+q independent variables (or 8 independent variables or less than 8 independent variables) that are fed into the loss function L( ) of Causal Bayesian Optimization for optimization. Accordingly, the values/results of 8+q causal variables (or 8 causal variables or less than 8 causal variables) that are able to minimize the loss function L( ) are calculated/found. The causal graph CG1 may significantly improve the ability to reason about optimal decision making strategies, thereby decreasing optimization cost and avoiding sub-optimal solutions.

In one embodiment, a causal model for optimization may be selected based on maximum a posterior (MAP) and point estimation to obtain/derive a causal graph of a loss function, phase adjustments, amplitude adjustments, and/or other independent variable(s). Accordingly, causal variables of a causal graph of the causal model (e.g., which causal variables are selected, the number of the causal variables, which attributes a causal variable has, or the number of the attributes of a causal variable) and a causal structure of the causal graph (e.g., how attributes connect to each other) are determined/found/created together (at a time or in one go). Deciding the causal variables and the causal structure simultaneously/parallelly may avoid problems incurred by deciding first causal variables and then a causal structure.

Figure 8:
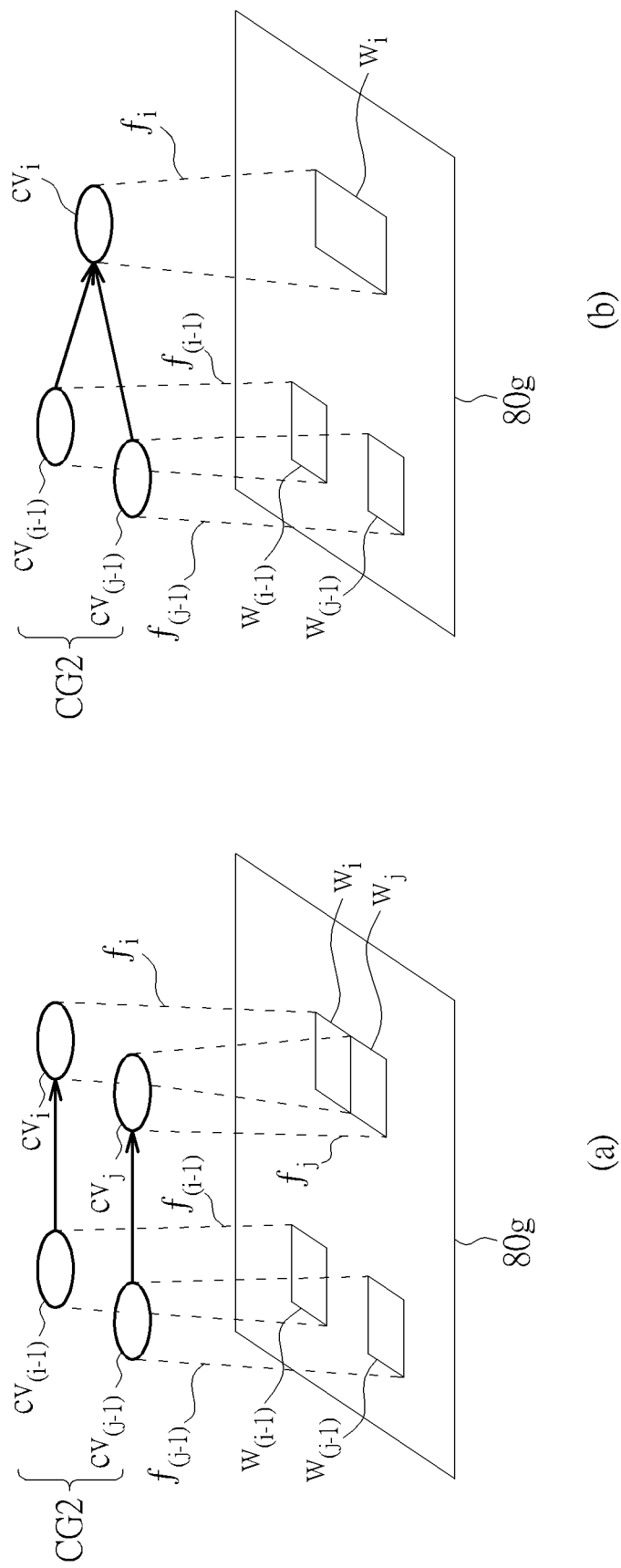
FIG. 8 is a schematic diagram of grounding data and part of a causal graph according to an embodiment of the present invention.

For example, FIG. 8 is a schematic diagram of grounding data 80g and part of a causal graph CG2 according to an embodiment of the present invention. In FIG. 8, (a) and (b) respectively illustrate two possibilities of the grounding data 80g and the causal graph CG2. The causal graph CG2 may serve as the causal graph CG1. In one embodiment, the grounding data 80g may be obtained or derived from the space of all observable samples, and thus may be referred to as observation data. In one embodiment, the grounding data 80g may include or be related to all signals communicated (e.g., the signals communicated in FIGS. 1 to 3 (e.g., the signals X, Z, the received signal Y, the input reference data θ, the output reference data T, DCI, UCI, a CSI report, or a signaling), other signals or other data stored internally (e.g., codebook or any information about possible combination(s) of precoding matrix/matrixes or combining matrix/matrixes)) at any time in any manner.

In FIG. 8, a causal structure of the causal graph CG2 may present the relationship between causal variables (e.g., $cv_{(i-1)}$, $cv_i$, $cv_{(j-1)}$, and $cv_j$). Observation functions $f_{(i-1)}$, $f_i$, $f_{(j-1)}$, and $f_j$ may be used to map subdata $w_{(i-1)}$, $w_i$, $w_{(j-1)}$, and $w_j$ of the grounding data 80g to the causal variables $cv_{(i-1)}$, $cv_i$, $cv_{(j-1)}$, and $cv_j$ so as to show the relationship between the causal variables $cv_{(i-1)}$, $cv_i$, $cv_{(j-1)}$, $cv_j$ and the subdata $w_{(i-1)}$, $w_i$, $w_{(j-1)}$, $w_j$ of the grounding data 80g. Here, i, j are positive integers. The mapping here is on a basis of the corresponding subdata (e.g., $w_{(i-1)}$, $w_i$, $w_{(j-1)}$, $w_j$) (e.g., framed area(s) in FIG. 8) instead of the (whole) grounding data 80g. For example, if the causal variable $cv_{(i-1)}$ corresponds to the phase adjustments $P_{dt}$, the subdata $w_{(i-1)}$ is related to (attributes of) the causal variable $cv_{(i-1)}$ (for example, the subdata $w_{(i-1)}$ is related to all data about the phase adjustments $P_{dt}$).

In one embodiment, a posterior probability $P(f_i, C|w_i)$ of assigning the subdata $w_i$ of the grounding data 80g to the observation function $f_i$ and a causal structure C of the causal graph CG may be maximized so as to determine/derive/select the corresponding causal structure C and the corresponding causal variable $cv_i$ (i.e., phase adjustments (e.g., $P_{dt}$, $P_{rt}$, $P_{rr}$, Par), amplitude adjustments (e.g., $A_{dt}$, $A_{rt}$, $A_{rr}$, $A_{dr}$), the loss function L( ), or the independent variables $O_1$ to $O_q$) based on the subdata $w_i$ of the grounding data 80g. Accordingly, inference of the causal model may be described by combining Bayesian network (e.g., for the causal structure) with the observation functions (e.g., $f_{(i-1)}$, $f_i$, $f_{(j-1)}$, and $f_j$). It is noteworthy that causal variables (e.g., $cv_{(i-1)}$, $cv_i$, $cv_{(j-1)}$, and $cv_j$) and the corresponding causal structure (e.g., C) of the corresponding causal graph (e.g., CG) are obtained/determined together (namely, the causal variables (e.g., $cv_{(i-1)}$, $cv_i$, $cv_{(j-1)}$, and $cv_j$) are learned along/together with the causal structure (e.g., C)), so the causal variables (e.g., $cv_{(i-1)}$, $cv_j$, $cv_{(j-1)}$, and $cv_j$) and the causal structure (e.g., C) may interact/affect/constrain each other.

In one embodiment, the posterior probability $P(f_i, C|w_i, Int)$ may satisfy $P(f_i, C|w_i, Int) \propto P(f_i, C) P(w_i|f_i, C, Int)$ according to the Bayesian rule, where $f_i$ may denote the corresponding observation function, C may denote the corresponding causal structure, $w_i$ may denote part of the grounding data 80g (e.g., subdata), and Int may denote intervention. In one embodiment, the posterior probability $P(f_i,C|w_i)$ may be proportional to $P(f_i,C) P(w_i|f_i,C)$ or $\Pi_{t=0}^{T}P(w_{i,t}|s_{t-1},C,f_i)^{(T-t)^{-\gamma}}$, where $w_i,t$ may denote the subdata corresponding to the causal variable $cv_i$ at a time instant t, C denotes the causal structure, $s_{t-1}$ may denote state(s) (of all causal variables) at a time instant t−1, T may denote a current/present time instant, and γ may be a real number such as 0.5, but is not limited thereto. In one embodiment, $P(w_i|f_i,C)$ may be $\Pi_{t=0}^{T}P(w_{i,t}|s_{t-1},C,f_i)$. In one embodiment, $P(w_{i,t}|s_{t-1},C,f_i)$ may be $$\frac{1}{|R_{s_t}|}\prod_{i=1}^{Ncv} P(s_{i,t}|s_{t-1}, C)$$

or $\Sigma_{s_t}P(w_{i,t}|s_t,f_i)\Pi_{i=1}^{Ncv}P(s_{i,t}|s_{t-1},C)$, where $s_{i,t}$ may denote the state of the causal variable $cv_i$ at a time instant t, $s_t$ may denote the state(s) at the time instant t, Ncv may denote the total number of all causal variables (e.g., including the causal variables $cv_{(i-1)}$, $cv_i$, $cv_{(j-1)}$, and $cv_j$), Ncv is a positive integer, and $R_{s_t}$ may denote the data amount of the subdata $w_i$ which is compatible with the state $s_i$ of the causal variable $cv_i$ within the grounding data 80g. In one embodiment, the present invention may select/find the causal variable $cv_i$ that minimizes the data amount $R_{s_t}$, such that data within the grounding data 80g which are frequently used (e.g., the subdata $w_i$) may be cut into finer pieces than those which are rarely used.

As set forth above, Bayesian probability mechanism may combine the number of causal variables (i.e., which phase adjustment (e.g., $P_{dt}$, $P_{rt}$, $P_{rr}$, $P_{dr}$), which amplitude adjustment (e.g., $A_{dt}$, $A_{rt}$, $A_{rr}$, $A_{dr}$), or which of the independent variables $O_1$ to $O_q$ is selected to create the causal graph CG2), states of the causal variables (e.g., including the causal variables $cv_{(i-1)}$, $cv_i$, $cv_{(j-1)}$, and $cv_j$), a causal structure of the causal variables, or observation functions for the causal variables (e.g., including the observation functions $f_{(i-1)}$, $f_i$, $f_{(j-1)}$, and $f_j$) and draw relevant joint inferences to explain/interpret the grounding data 80g, thereby creating the causal graph CG2. The causal variables (e.g., including the causal variables $cv_{(i-1)}$, $cv_i$, $cv_{(j-1)}$, and $cv_j$) of the causal graph CG2 (or the number of the causal variables) and the causal structure (e.g., C) are determined at the same time, thereby differentiating (a) from (b) of FIG. 8, and vice versa.

As shown in FIG. 8, each causal variable (e.g., $cv_i$) may correspond to an observation function (e.g., $f_i$). In one embodiment, an observation function (e.g., $f_i$) may be calculated/derived using a causal semantic generative (CSG) model so as to predict low-dimensional state attributes (e.g., attribute(s) of the state of the causal variable $cv_i$) from high-dimensional environmental variables (e.g., the grounding data 80g). When causal variables (e.g., $cv_{(i-1)}$, $cv_i$, $cv_{(j-1)}$, and $cv_j$) are manually defined, each causal variable (e.g., $cv_i$) may have a dedicated CSG observation function to ground the causal variable onto the corresponding subdata (e.g., the $w_i$) (e.g., a framed area in FIG. 8). This means that subdata (e.g., the subdata $w_{(i-1)}$, $w_i$, $w_{(j-1)}$, or $w_j$ corresponding to the framed area in FIG. 8) is determined based on the definition(s) of particular causal variable(s) from domain expert(s). Moreover, the CSG model may avoid deeming variation factor(s) cause(s) of a causal variable (e.g., $cv_i$), and may correctly determine semantic factor(s) to be the cause(s) of the causal variable (e.g., $cv_i$). In one embodiment, variation factor(s) and semantic factor(s) may constitute/belong to observation data. In one embodiment, the CSG model is primarily based on causal invariance principle and involves variational Bayes.

In one embodiment, the observation function $f_i$ may satisfy $s_{i,t}=f_i(w_{i,t})$. In one embodiment, the observation function $f_i$ may be implemented using multivariate Gaussian distribution: For example, the observation function $f_i$ may satisfy $$f_i(w_i, z) = N\left(\begin{pmatrix} w_i \\ z \end{pmatrix} \middle| \begin{pmatrix} \mu_{w_i} \\ \mu_z \end{pmatrix}, \Sigma\right).$$

Alternatively, the observation function $f_i$ may be related to $$N\left(\begin{pmatrix} w_i \\ z \end{pmatrix} \middle| \begin{pmatrix} \mu_{w_i} \\ \mu_z \end{pmatrix}, \Sigma\right),$$

where z may denote subdata (which does not contribute to the causal variable $cv_i$) within the grounding data 80g, $\mu_{w_i}$, $\mu_v$ may denote means fixed as zero vectors, Σ may be parameterized by Cholesky decomposition to satisfy, for example, $\Sigma=LL^T$. The matrix L may be a lower-triangular matrix with positive diagonals and may, for example, be parameterized to satisfy $$L = \begin{pmatrix} L_{w_iw_i} & 0 \\ M_{zw_i} & L_{zz} \end{pmatrix}.$$

Each of the matrixes $L_{w_iw_i}$, $L_{zz}$ may be smaller lower triangular matrixes. The matrix $M_{zw_i}$ may be any arbitrary matrix. Each of the matrixes $L_{w_iw_i}$, $L_{zz}$ may be parameterized by a summation of positive diagonal elements (guaranteed via an exponential map) and a lower triangular matrix (without positive diagonal elements).

Figure 9:
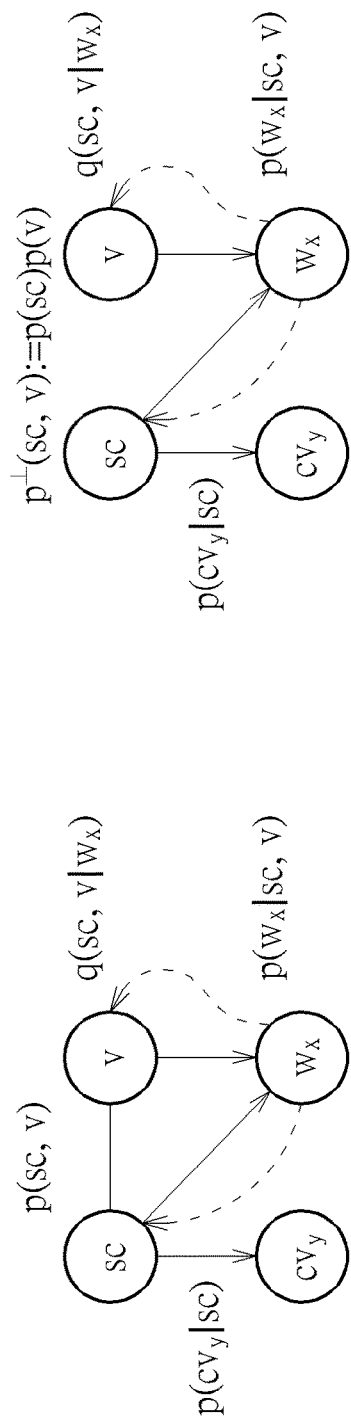
FIG. 9 is a schematic diagram of a causal variable and subdata according to an embodiment of the present invention.
Figure 9:
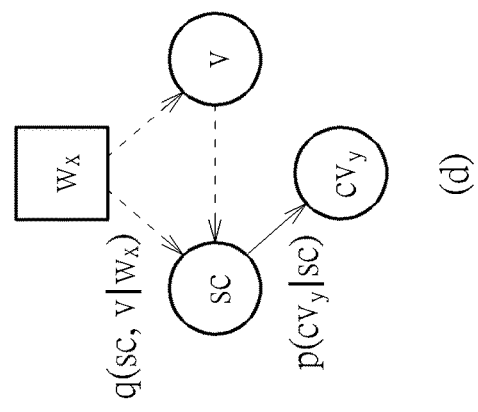
Figure 9:
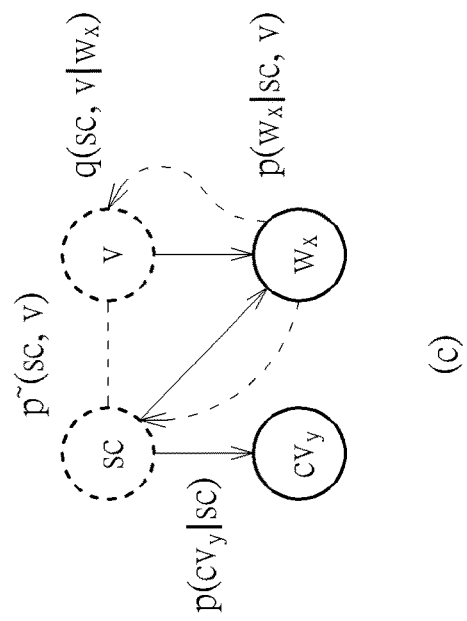

In one embodiment, the relationship between causal variables (e.g., $cv_i$) and subdata (e.g., $w_i$) may be unknown, but the causal variables may be predicted/inferred from the subdata using a CSG model. For example, FIG. 9 is a schematic diagram of a causal variable $cv_y$ and subdata $w_x$ according to an embodiment of the present invention, where (a), (b), (c), and (d) respectively illustrate structure possibilities of the CSG model, sc may represent a semantic factor, v may represent a variation factor, solid arrows may represent causal mechanisms $p(w_x|sc, v)$ and $p(cv_y|sc)$, dashed arrows may represent an inference model $q(sc,v|w_x)$ for learning. In (a) of FIG. 9, a solid undirected line between the semantic factor sc and the variation factor v may represent a domain-specific prior $p(sc, v)$. Compared with the solid undirected line between the semantic factor sc and the variation factor v in (a) of FIG. 9, (b) of FIG. 9 introduces an independent prior $p^{\perp}(sc, v):=p(sc)p(v)$ to reflect intervention so as to improve out-of-distribution generalization performance. Compared with the solid undirected line between the semantic factor sc and the variation factor v in (a) of FIG. 9, (c) of FIG. 9 introduces a prior $p^{-}(sc, v)$ presented by a dotted line between the semantic factor sc and the variation factor v to reflect intervention according to causal invariance principle so as to leverage unsupervised data. In one embodiment, the present invention may fit the CSG model p:=<p(sc, v), $p(w_x|sc, v)$, $p(cv_y|sc)$> to subdata by maximizing likelihood, perform calculation using variational inference and evidence lower bound (ELBO), and use Monte Carlo to estimate expectations after applying reparameterization tricks.

In one embodiment, Causal Bayesian Optimization may perform optimization only for causal variables directly related to the loss function L( ) (e.g., the phase adjustments $P_{dt}$, $P_{rt}$, $P_{rr}$, $P_{dr}$, the amplitude adjustments $A_{dt}$, $A_{rt}$, $A_{rr}$, $A_{dr}$, and/or the independent variables $O_1$ to $O_q$ in causal graph CG1, which directly point to or affect the loss function LO). In other words, the causal intrinsic dimensionality of Causal Bayesian Optimization is given by the number (e.g., 8 or 8+q) of the independent variables $O_1$ to $O_q$ (which is optional and may be omitted), the phase adjustments $P_{dt}$, $P_{rt}$, $P_{rr}$, $P_{dr}$, and/or the amplitude adjustments $A_{dt}$, $A_{rt}$, $A_{rr}$, $A_{dr}$, which are causes/parents of the loss function L( ), rather than the number of causal variables which are causes of the independent variables $O_1$ to $O_q$, the phase adjustments $P_{dt}$, $P_r$, $P_{rr}$, $P_{dr}$, and/or the amplitude adjustments $A_{dt}$, $A_{rt}$, $A_{rr}$, $A_{dr}$, thereby improving the ability to reason about optimal decision making strategies.

In one embodiment, causal variables (e.g., the phase adjustments $P_{dt}$, $P_{rt}$, $P_{rr}$, $P_{dr}$, the amplitude adjustments $A_{dt}$, $A_{rt}$, $A_{ff}$, $A_{dr}$, the independent variables $O_1$ to $O_q$, which serve as causal variables, or the causal variables $cv_{(i-1)}$, $cv_i$, $cv_{(j-1)}$, $cv_j$) are manually defined (e.g., by domain expert(s)). For example, causal variables are defined by domain experts (nonautomatically and individually); alternatively, causal variables are defined automatically using a program with rules described by domain experts. In one embodiment, subdata (e.g., the subdata $w_{(i-1)}$, $w_i$, $w_{(j-1)}$, and $w_j$ corresponding to the framed areas in FIG. 8) is defined/determined according to the definition of specific causal variables by domain experts.

The phase adjustments (e.g., $P_{dt}$, $P_{rt}$, $P_{rr}$, $P_{dr}$, P1 to Pm), the amplitude adjustments (e.g., $A_{dt}$, $A_{rt}$, $A_{rr}$, $A_{dr}$, A1 to An), the precoding matrix (e.g., F, B), the combining matrix (e.g., $W_F$, $W_B$) is a function of time (that is, the values at different time instants are different) so as to transmit or receive beams with appropriate angles or strengths at each time instant. Causal Bayesian Optimization treats causal variable(s) being output (e.g., the loss function LO) and causal variable(s) being input (e.g., the phase adjustments $P_{dt}$, $P_{rt}$, $P_{rr}$, $P_{dr}$, the amplitude adjustments $A_{dt}$, $A_{rt}$, $A_{rr}$, $A_{dr}$, and/or the independent variables $O_1$ to $O_q$) as invariant independent variables, and disregards the existence of a temporal evolution in both the causal variable(s) being output and the causal variable(s) being input (i.e., whether the causal variable(s) being output and the causal variable(s) being input change over time), and thus breaks the time dependency structure existing among causal variables. While disregarding time may significantly simplify the problem, it prevents the identification of an optimal intervention at every time instant, and (especially in a non-stationary scenario) may lead to a sub-optimal solution instead of providing the current optimal solution at any time instant. Thus, the present invention may extend to Dynamic Causal Bayesian Optimization, which offer/account for the causal relationship between causal variables and the causal relationship may evolve/change over time, and thus facilitates in scenarios where all causal effects in a causal graph vary over time.

Figure 10:
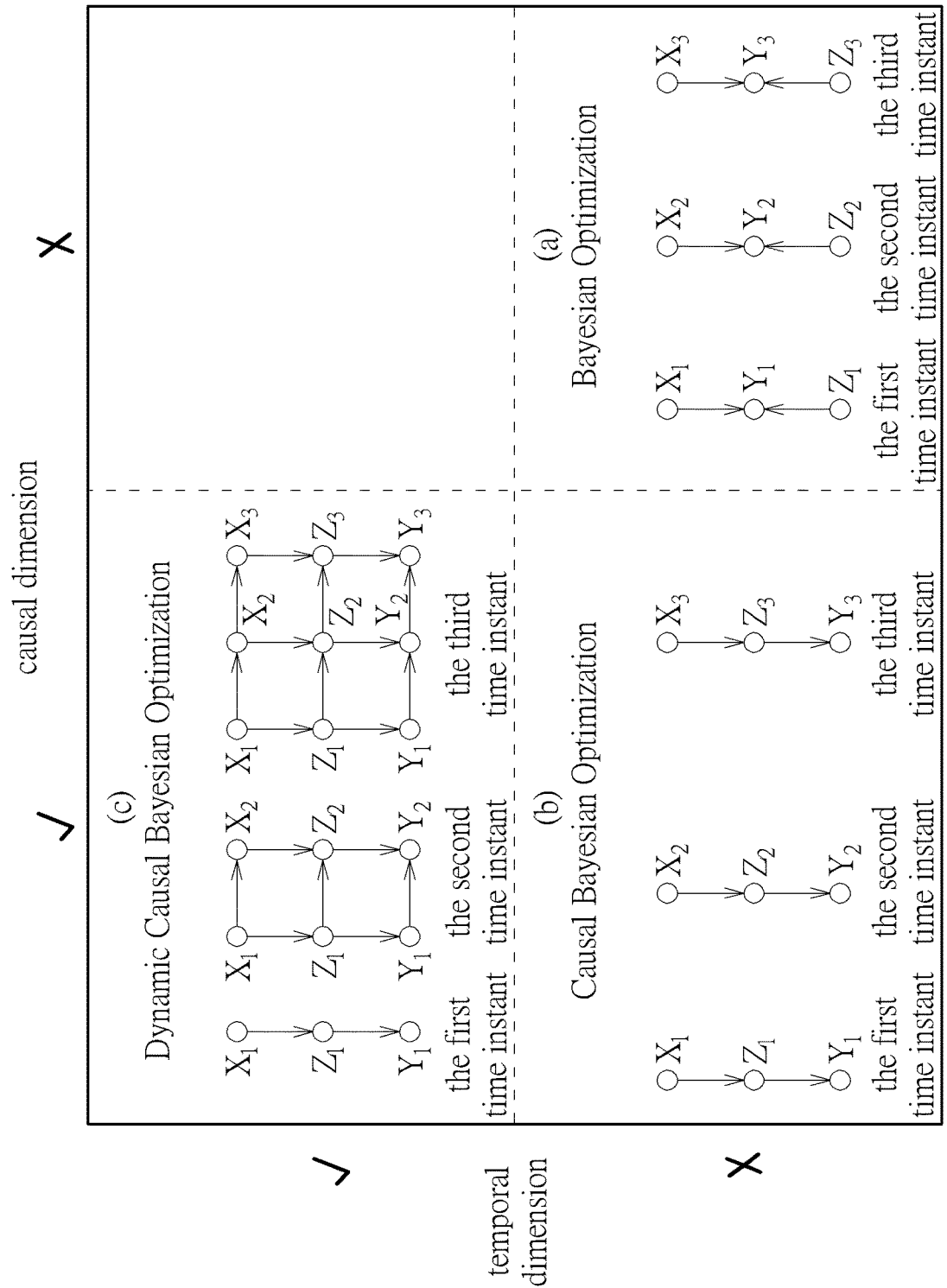
FIG. 10 is a schematic diagram of Bayesian Optimization, Causal Bayesian Optimization, and Dynamic Causal Bayesian Optimization.

For example, FIG. 10 is a schematic diagram of Bayesian Optimization, Causal Bayesian Optimization, and Dynamic Causal Bayesian Optimization. In FIG. 10, $X_1$ to $X_3$ represent a causal variable at three different time instants. $Y_1$ to $Y_3$ represent another causal variable at three different time instants. $Z_1$ to $Z_3$ represent the other causal variable at three different time instants. However, the present invention is not limited thereto and may extend to more time instants or more causal variables. Dynamic Causal Bayesian Optimization combines Bayesian Optimization and Causal Bayesian Optimization to account for the causal relationships among causal variables, and the causal relationship may evolve over time. For example, in Dynamic Causal Bayesian Optimization, as shown in FIG. 10, the causal variable $Y_1$ at the first time instant is a function of the causal variable $Z_1$ at the first time instant; therefore, the extremum value of the causal variable $Y_1$ (which may represent or correspond to the loss function LO) may be found by using only the causal variable $Z_1$, which is directly related to the causal variable $Y_1$, and the causal intrinsic dimensionality is 1. Similarly, the causal variable $Y_2$ at the second time instant is a function of the causal variable $Z_2$ at the second time instant and the causal variable $Y_1$ at the first time instant; therefore, the extremum value of the causal variable $Y_2$ (which may represent or correspond to the loss function LO) may be found by using only the causal variable $Y_1$ and $Z_2$, which are directly related to the causal variable $Y_2$, and the causal intrinsic dimensionality is 2. Similarly, the causal variable $Y_3$ at the third time instant is a function of the causal variable $Z_3$ at the third time instant and the causal variable $Y_2$ at the second time instant; therefore, the extremum value of the causal variable $Y_3$ (which may represent or correspond to the loss function LO) may be found by using only the causal variable $Y_2$ and $Z_3$, which are directly related to the causal variable $Y_3$, and the causal intrinsic dimensionality is 2. In other words, a causal variable serving as a dependent variable at a time instant is a function of causal variable(s) at previous time instant(s) (serving either as dependent or independent variable(s)), and therefore the extremum value of the former (i.e., a causal variable serving as a dependent variable at a certain time instant) may be found by using only the latter directly related to the former (i.e., causal variable(s) serving either as dependent or independent variable(s) at previous time instant(s)).

The optimal precoding matrix/matrixes and the optimal combining matrix/matrixes, which are found using Dynamic Causal Bayesian Optimization, may be applied to the precoder(s) and combiner(s) to achieve the maximum sum rate.

In one embodiment, the storage circuit is configured to store image data or instructions. The storage circuit may be a read-only memory (ROM), a flash memory, a random access memory (RAM), a hard disk, a non-volatile storage device, a non-transitory computer-readable medium, but is not limited thereto. In one embodiment, the processing circuit is configured to execute instructions (stored in the storage circuit). The processing circuit may be a microprocessor, or an application-specific integrated circuit (ASIC), but is not limited thereto.

In one embodiment, the signals Z, X, and the received signal Y may be radio-frequency signals. The frequency spectrum may be in a range of 1 kHz to 300 GHz, but is not limited thereto.

In an embodiment, the transmitter (e.g., 120, 220, or 320) may be a radio unit (RU) and the receiver (e.g., 360$_1$ to 360$_U$, 260, or 160) may be customer-premises equipment (CPE). However, the present invention is not limited thereto. For example, the transmitter may be a base station, such as a fixed station that exchange data and control information with user side or another base station. The receiver may be user side such as user equipment (UE), user side equipment, or a fixed or mobile device.

In another embodiment, the transmitter may be CPE and the receiver may be an RU, but the present invention is not limited thereto. For example, the transmitter may be user side, and the receiver may be a base station.

In an embodiment, the communication system (e.g., 10, 20, or 30) may further include other communication devices (e.g., a server, a distributed unit (DU), or a radio resource management unit) in addition to the RU, the UE, or the CPE. In one embodiment, the DU may include a radio resource management unit, and may send or receive DCI, UCI, or signaling, so as to control the user side or query information of the user side. In one embodiment, the causal model or algorithm (e.g., the optimization method 40) of the present invention may be stored in the radio resource management unit or the DU, but not limited thereto. The optimization method may be executed by the radio resource management unit or the DU, but not limited thereto.

In summary, for a DU, the present invention proposes a methodology for maximizing beamforming throughput. The present invention minimizes the mean square error based on Dynamic Causal Bayesian Optimization, provides separately designed analog and digital beamformers at the transmitter and the receiver(s) using Dynamic Causal Bayesian Optimization with separate transmit precoding and receive combining to maximize the beamforming sum rate (i.e., throughput).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optimization method, comprising:
   determining at least one precoding matrix and at least one combining matrix together according to Bayesian Optimization, Causal Bayesian Optimization, or Dynamic Causal Bayesian Optimization; and
   outputting the at least one precoding matrix and the at least one combining matrix, wherein one precoding matrix is configured for at least one precoder of a transmitter, and the at least one combining matrix is configured for at least one combiner of at least one receiver.

2. The optimization method of claim 1, wherein the step of determining the at least one precoding matrix and the at least one combining matrix together according to Bayesian Optimization, Causal Bayesian Optimization, or Dynamic Causal Bayesian Optimization comprises:
   applying the Bayesian Optimization, the Causal Bayesian Optimization, or the Dynamic Causal Bayesian Optimization to at least one data to determine the at least one precoding matrix and the at least one combining matrix, wherein the at least one data is related to at least one reference signal sent by the transmitter or received by the at least one receiver, downlink control information, uplink control information, or a signaling.

3. The optimization method of claim 1, wherein the step of determining the at least one precoding matrix and the at least one combining matrix together according to Bayesian Optimization, Causal Bayesian Optimization, or Dynamic Causal Bayesian Optimization comprises:
   determining a plurality of independent variable optimal values together according to the Bayesian Optimization, the Causal Bayesian Optimization, or the Dynamic Causal Bayesian Optimization, wherein the plurality of independent variable optimal values comprises at least one first phase adjustment corresponding to the at least one precoding matrix, at least one first amplitude adjustment corresponding to the at least one precoding matrix, at least one second phase adjustment corresponding to the at least one combining matrix, and at least one second amplitude adjustment corresponding to the at least one combining matrix.

4. The optimization method of claim 3, wherein the plurality of independent variable optimal values further comprises at least one first independent variable optimal value not directly related to the at least one precoding matrix and the at least one combining matrix.

5. The optimization method of claim 1, wherein the step of determining the at least one precoding matrix and the at least one combining matrix together according to Bayesian Optimization, Causal Bayesian Optimization, or Dynamic Causal Bayesian Optimization comprises:
   searching for a plurality of independent variable optimal values together from a plurality of independent variables according to the Causal Bayesian Optimization or the Dynamic Causal Bayesian Optimization, wherein a causal structure of a causal graph, which is configured for a loss function and the at least one independent variable, and the at least one independent variable of the causal graph are determined together, and the loss function is a function of at least one reference signal sent by the transmitter or received by the at least one receiver.

6. The optimization method of claim 5, wherein the causal graph is generated based on maximum a posteriori and point estimation.

7. The optimization method of claim 5, further comprising:
   mapping a plurality of subdata in a grounding data to the loss function and the at least one independent variable of the causal graph by using a plurality of observation functions, to generate the causal graph from the grounding data based on maximum a posteriori and point estimation.

8. The optimization method of claim 7, wherein the plurality of observation functions are obtained based on a causal semantic generative model.

9. The optimization method of claim 1, wherein the step of determining the at least one precoding matrix and the at least one combining matrix together according to Bayesian Optimization, Causal Bayesian Optimization, or Dynamic Causal Bayesian Optimization comprises:
   searching for at least one independent variable optimal value from at least one independent variable according to the Dynamic Causal Bayesian Optimization, wherein a second loss function at a second time instant is a function of the at least one independent variable at the second time instant, the at least one independent variable at a first time instant, or a first loss function at the first time instant.

10. The optimization method of claim 1, wherein each of the at least one receiver is one of a user side equipment and a radio unit, and the transmitter is the other one of the user side equipment and the radio unit.

11. A communication device, comprising:
    a storage circuit, configured to store instructions of:
        determining at least one precoding matrix and at least one combining matrix together according to Bayesian Optimization, Causal Bayesian Optimization, or Dynamic Causal Bayesian Optimization; and
        outputting the at least one precoding matrix and the at least one combining matrix, wherein one precoding matrix is configured for at least one precoder of a transmitter, and the at least one combining matrix is configured for at least one combiner of at least one receiver; and a processing circuit, coupled to the storage device, configured to execute the instructions stored in the storage circuit.

12. The communication device of claim 11, wherein the step of determining the at least one precoding matrix and the at least one combining matrix together according to Bayesian Optimization, Causal Bayesian Optimization, or Dynamic Causal Bayesian Optimization comprises:

applying the Bayesian Optimization, the Causal Bayesian Optimization, or the Dynamic Causal Bayesian Optimization to at least one data to determine the at least one precoding matrix and the at least one combining matrix, wherein the at least one data is related to at least one reference signal sent by the transmitter or received by the at least one receiver, downlink control information, uplink control information, or a signaling.

13. The communication device of claim 11, wherein the step of determining the at least one precoding matrix and the at least one combining matrix together according to Bayesian Optimization, Causal Bayesian Optimization, or Dynamic Causal Bayesian Optimization comprises:

determining a plurality of independent variable optimal values together according to the Bayesian Optimization, the Causal Bayesian Optimization, or the Dynamic Causal Bayesian Optimization, wherein the plurality of independent variable optimal values comprises at least one first phase adjustment corresponding to the at least one precoding matrix, at least one first amplitude adjustment corresponding to the at least one precoding matrix, at least one second phase adjustment corresponding to the at least one combining matrix, and at least one second amplitude adjustment corresponding to the at least one combining matrix.

14. The communication device of claim 13, wherein the plurality of independent variable optimal values further comprises at least one first independent variable optimal value not directly related to the at least one precoding matrix and the at least one combining matrix.

15. The communication device of claim 11, wherein the step of determining the at least one precoding matrix and the at least one combining matrix together according to Bayesian Optimization, Causal Bayesian Optimization, or Dynamic Causal Bayesian Optimization comprises:

searching for a plurality of independent variable optimal values together from a plurality of independent variables according to the Causal Bayesian Optimization or the Dynamic Causal Bayesian Optimization, wherein a causal structure of a causal graph, which is configured for a loss function and the at least one independent variable, and the at least one independent variable of the causal graph are determined together, and the loss function is a function of at least one reference signal sent by the transmitter or received by the at least one receiver.

16. The communication device of claim 15, wherein the causal graph is generated based on maximum a posteriori and point estimation.

17. The communication device of claim 15, further comprising:

mapping a plurality of subdata in a grounding data to the loss function and the at least one independent variable of the causal graph by using a plurality of observation functions, to generate the causal graph from the grounding data based on maximum a posteriori and point estimation.

18. The communication device of claim 17, wherein the plurality of observation functions are obtained based on a causal semantic generative model.

19. The communication device of claim 11, wherein the step of determining the at least one precoding matrix and the at least one combining matrix together according to Bayesian Optimization, Causal Bayesian Optimization, or Dynamic Causal Bayesian Optimization comprises:

searching for at least one independent variable optimal value from at least one independent variable according to the Dynamic Causal Bayesian Optimization, wherein a second loss function at a second time instant is a function of the at least one independent variable at the second time instant, the at least one independent variable at a first time instant, or a first loss function at the first time instant.

20. The communication device of claim 11, wherein each of the at least one receiver is one of a user side equipment and a radio unit, and the transmitter is the other one of the user side equipment and the radio unit.

\* \* \* \* \*